(No Model.) 2 Sheets—Sheet 1.
J. C. BURDICK.
FISH TRAP.
No. 564,553. Patented July 21, 1896.
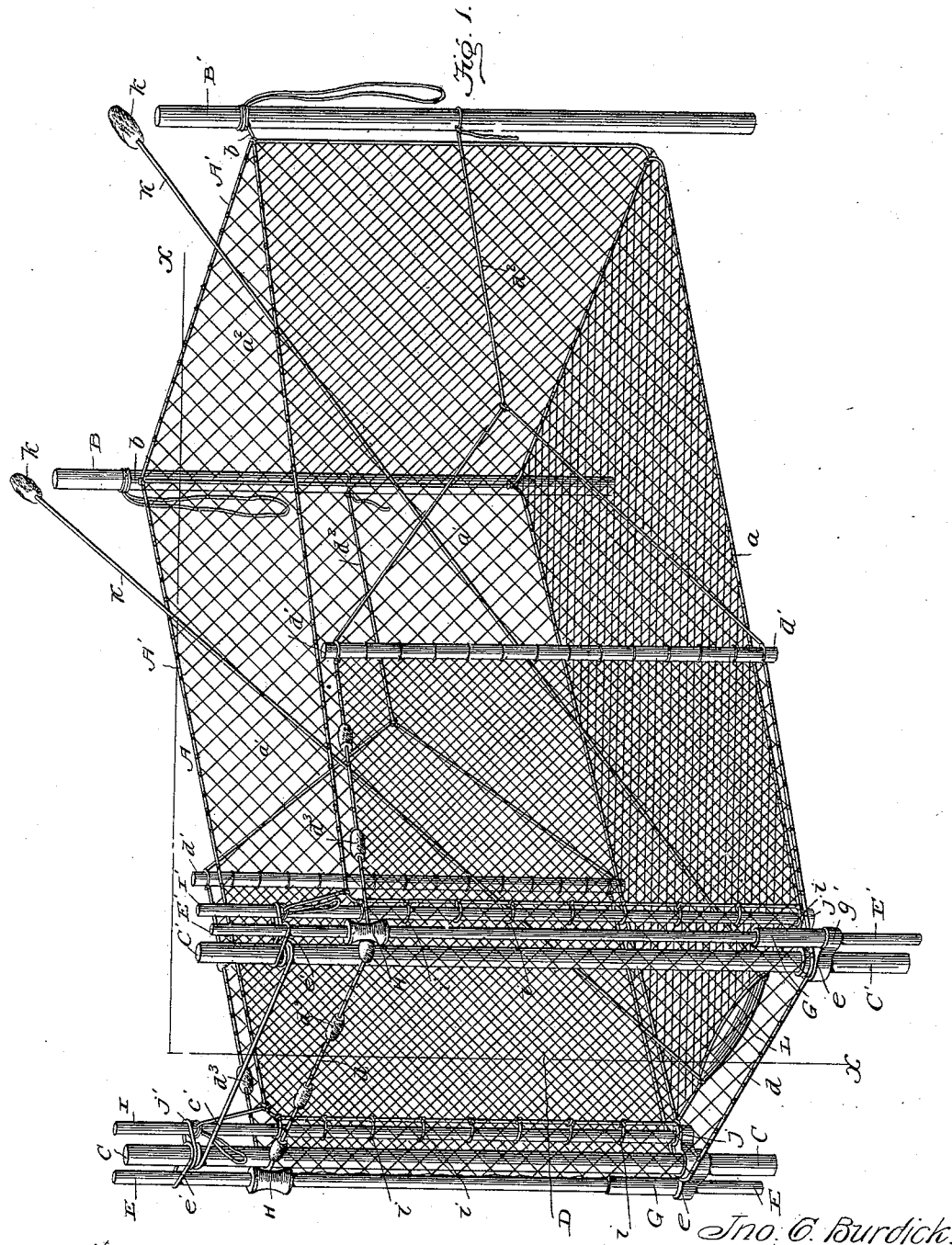
Witnesses—
Jno. C. Burdick.
Inventor.
By Edson Bros.
Att'ys.

(No Model.) 2 Sheets—Sheet 2.
J. C. BURDICK.
FISH TRAP.
No. 564,553. Patented July 21, 1896.
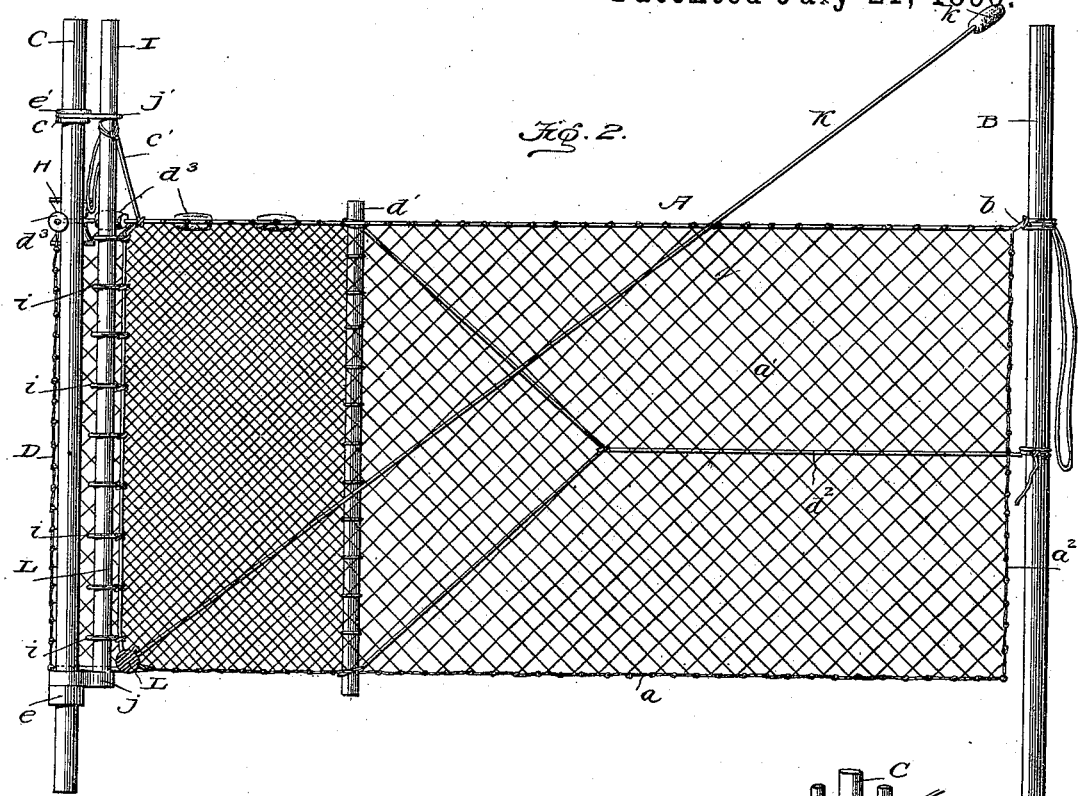
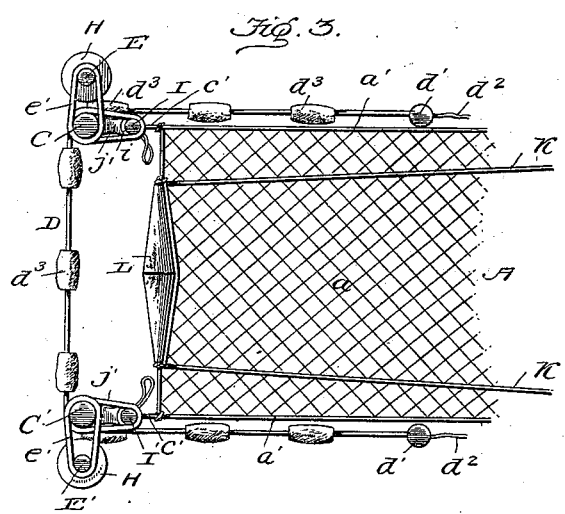
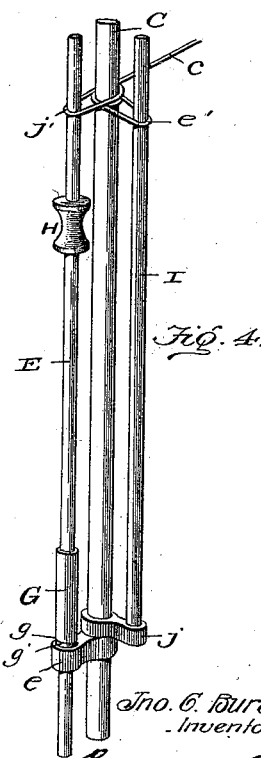
Witnesses
Jno. C. Burdick.
Inventor.

UNITED STATES PATENT OFFICE.

JOHN CARLOS BURDICK, OF UNION CITY, TENNESSEE, ASSIGNOR OF ONE-HALF TO JOHN W. HANDLY, OF SAME PLACE.

FISH-TRAP.

SPECIFICATION forming part of Letters Patent No. 564,553, dated July 21, 1896.

Application filed February 5, 1896. Serial No. 578,113. (No model.)

*To all whom it may concern:*

Be it known that I, JOHN CARLOS BURDICK, a citizen of the United States, residing at Union City, in the county of Obion and State of Tennessee, have invented certain new and useful Improvements in Fishing-Traps; and I do hereby declare the following to be a full, clear, and exact description of the invention, such as will enable others skilled in the art to which it appertains to make and use the same.

My invention relates to what may be called an "open-water seine-landing," the purpose of which is to facilitate the catching of fish in open water when none other than an artificial landing can be had, and to enable the fish to be removed from the crib and seine with ease and expedition.

A further object of my invention is to provide an improved crib in which the fish are caught and held, which crib can be raised and suspended to serve the purposes of a live-net until it is convenient to remove the fish.

A further object of the invention is to provide means for securely closing the mouth of the crib to prevent the escape of the fish either before or after the seine has been hauled, which means permit the seine to be adjusted over the mouth of the crib with ease.

A further object of the invention is to provide a simple and inexpensive construction in which the wear and friction on the netting-cords is reduced to a minimum, the parts are securely confined or held against accidental displacement, and the handling of the crib and seine is promoted and rendered very easy and convenient.

With these ends in view my invention consists, broadly, of a crib made of netting with a bottom, two side walls, and a rear wall, and said crib is suspended or confined to and between stanchions in a manner to leave a contracted open mouth, in combination with a seine which can be manipulated to haul the fish and adjusted to close the open mouth of the crib against the escape of the fish, and means for confining or holding the seine in position across said open mouth of the crib.

My invention further consists in the means for holding the end edges of the crib-netting at the mouth of the crib in a manner to permit the crib-netting to be raised in order to remove the fish from the crib.

My invention further consists in the provision of means for holding the seine across and around the mouth of the crib, which means contemplates the use of auxiliary stanchions arranged in such relation to the crib-stanchions as to permit the seine to pass between the two sets of stanchions in adjusting the seine across the open mouth of the crib, and in antifriction devices on the auxiliary stanchions to reduce the wear and friction on the seine-netting; and the invention further consists in the construction and arrangement of parts, which will be hereinafter fully described and claimed.

To enable others to understand my invention I have illustrated the preferred embodiment thereof in the accompanying drawings, forming a part of this specification, and in which—

Figure 1 is a perspective view of my crib-net and seine. Fig. 2 is a vertical longitudinal sectional view thereof on the plane indicated by the dotted line $x\ x$ of Fig. 1. Fig. 3 is a plan view showing the mode of disposing the stanchions at the mouth of the crib. Fig. 4 is an elevation of one set of stanchions at one side of the crib for the purpose of holding one edge of the crib-net in place and for retaining the seine in position between the crib-stanchions and the seine-stanchions.

Like letters of reference denote corresponding parts in all the figures of the drawings.

The crib is designated by the letter A. It is shown as made of netting attached to stout cords A' at the top of the crib, and it consists of the bottom $a$, the side walls $a'\ a'$, and the rear end wall $a^2$, all woven together, or made separately and united in a suitable way to present a single unitary structure. The crib is attached to four stanchions, indicated by the reference-letters B B' C C', which stanchions are made of wood, metal pipe, or any other appropriate material, and which are of such length as to be thrust into or embedded in the mud or sand at the bottom of the water and to project a suitable height above the water, so as to be readily observable at all times.

D designates the seine, which is made of netting and is of a width approximating the depth of the crib, and is of such length as to be stretched across the mouth of the crib and lap around the sides of the crib, so as to prevent the escape of the fish from said crib.

The seine is to be held or confined in place between the stanchions C C' at the mouth of the crib and certain auxiliary stanchions E E'. These auxiliary stanchions E E' are placed quite close up to and parallel with the crib-stanchions C C', but at sufficient distance therefrom to permit the seine-netting to be easily passed between the stanchions C C' and E E'. The lower ends of the seine-stanchions E E' are connected to the crib-stanchions C C' by means of the couplings $e$, which are approximately 8-shaped in form. Each coupling $e$ is made with an opening at one end to enable the coupling to be slipped over the crib-stanchion C or C' and to slide freely up and down thereon, and to the other end of the coupling $e$ is rigidly attached or fastened, in any suitable way, the foot or lower end of the auxiliary seine-stanchion. These couplings $e$ serve to maintain the auxiliary stanchions E E' in proper relation to the crib-stanchions, and the upper ends of the auxiliary stanchions are held in position by means of the loose links $e'$ $e'$, which are slipped over the upper exposed ends of the two sets of stanchions C C' and E E'. The crib-stanchions C C' at the mouth of the crib are stayed and prevented from spreading by means of the horizontal rod or brace $c$, which is fastened to the stanchions above the water-level, and this stay-rod $c$ serves to arrest the descent of the retaining-links $e'$ $e'$, so that the latter can be reached whenever desired.

The seine D is made of netting attached to stout ropes or lines $d$ $d$ at top and bottom thereof, and at its ends this seine has the cross-bars $d'$ and the fastening cords or ropes $d^2$, by which the seine can be secured to the stanchions B B' after the seine has been hauled and adjusted across the open mouth of the crib. The seine is further provided with the floats $d^3$, which are strung along the cord or line $d$ at the top edge of the seine, as shown. To reduce the friction and wear on the seine-netting to a minimum when the seine is adjusted or removed at the open mouth of the crib, I have provided the antifriction devices G H, which are preferably placed on the auxiliary seine-stanchions.

The antifriction-sleeves G are preferably made of metal, with enlarged lower ends $g$, which are adapted to rest on the loose collars or washers $g'$, and these sleeves and washers are slipped over the auxiliary stanchions E E' and allowed to descend thereon until the washers $g'$ rest on the couplings $e$ and the sleeves rest on the washers, whereby the sleeves or thimbles G afford a yielding bearing for the lower part of the seine to ride or bear against when the seine is drawn between the stanchions C E or C' E'. The other antifriction devices H consist of floatable pulleys, preferably made of wood and with grooved peripheries, and these wooden grooved pulleys H are fitted loosely on the stanchions E E', so as to float on the water and to turn freely on the stanchions E E' to likewise offer a yielding bearing for the upper part and the floats of the seine to ride against when the seine is drawn between the two sets of stanchions.

The crib A is made somewhat tapering in form, with its closed rear end somewhat wider than the open front end. The crib may be proportioned to have the mouth or open end about four feet (4') wide, the closed back or rear end about twelve feet (12') wide, the sides about eighteen (18') feet long, and the depth according to the depth of the water to be seined; but I would have it understood that I do not limit myself to these proportions, because I am aware that the proportions can be changed within wide limits without departing from the spirit of my invention.

The rear crib-stanchions B B' are driven into the bottom of the stream a suitable distance from each other according to the width of the closed rear end of the crib, while the other stanchions C C' are thrust into the bed of the stream a distance from each according to the desired width at the mouth of the crib, said stanchions C C' being arranged a distance from the stanchions B B' according to the length of the crib. The closed rear end of the crib is fastened to the stanchions B B' by stout cords or ropes $b$ $b$, but the free end edges of the crib-netting are slidably connected in a peculiar way to the stanchions C C', so as to permit the mouth end of the crib to be raised to the surface of the water for the purpose of more easily removing the fish from the crib. Along the vertical end edges of the crib-netting at the mouth of the crib are strung the rings or loops $i$, which are loosely fitted over the stationary guide-rods I I'. These guide-rods are arranged on the inside of the main stanchions C C', so as to be out of the way of the stanchions E E' and the seine, and the lower ends of said guide-rods I I' are provided with angular feet $j$, which extend out from said rods. These feet $j$ have openings to enable them to be fitted on the stanchions C C' and to slide up and down freely thereon, and said feet $j$ are adapted to rest upon the couplings $e$, which unite the main and auxiliary stanchions C C' E E'. The upper ends of the guide-rods I I' are held in place by means of links $j'$, which are loosely fitted over the exposed upper ends of the stanchions C C' and rods I I', and which links are adapted to rest on the stay-rod $c$ or the links $e'$, so as to prevent the links $j'$ from dropping out of position. The free ends of the crib-netting are also attached to the guide-rods by means of the cords $c'$, as shown, to prevent the crib from sinking or being pulled down. To provide for conveniently lifting the crib at its contracted open end or mouth, suitable pull-cords K are fastened to the bottom part of the crib, near the mouth thereof, and these pull-cords are provided with floats $k$, which are designed to float on the surface of the water and prevent the cords K from sinking out of sight, so that the operator can easily and at all times seize the pull-cords and lift the crib, the loops or rings $i$ of which will slide easily and freely on the stationary guide-rods I I'. The crib is provided with a suitable weight or weights L to cause it to readily sink in the water and to remain in position.

This being the construction of my crib and seine, the operation may be described briefly as follows: The seine is thrown out, the ends are brought around in a circle, and the ends are passed between the stanchions C E on the left-hand side and between the stanchions C' E' on the right-hand side, after which the ends of the seine are confined in place by attaching the cords $d^2$ to the stanchions B B', or otherwise. The ends of the seine overlap the sides of the crib and the seine closes the mouth of the crib, because the space between the stanchions C E or C' E' is only large enough to admit the passage of the seine, but is small enough to prevent the escape of the fish. When the seine has been properly drawn between the stanchions and the mouth of the crib thereby closed, the mouth of the crib is raised by pulling the pull-cords K, and the fish may then be taken out, or the mouth of the crib, when raised, may be suspended in a suitable way and the fish be removed at pleasure, in the meantime the crib answering the purposes of a live-net. In taking the fish out of the crib a boat is run up immediately behind the closed rear end of the crib and the top of the back wall of the crib is attached by means of hooks on the inside of and near the top of the boat. The crib is now raised, beginning at the mouth, so that the fish may be dumped over into the boat without having to handle them with the hands. This operation may be repeated at will or until the supply of fish is exhausted within the radius seined. If desired, the crib may be removed, leaving the stanchions B B', C C', and E E' standing for future use.

I am aware that changes in the form and proportion of parts and in the details of construction of the devices herein shown and described as the preferred embodiment of my invention may be made by a skilled mechanic without departing from the spirit or sacrificing the advantages of my invention, and I therefore reserve the right to make such modifications and alterations as fairly fall within the scope of my invention.

Having thus fully described my invention, what I claim as new, and desire to secure by Letters Patent, is—

1. The combination of suitable anchoring-stanchions, a crib-netting attached to said stanchions and having an opening or mouth at one end, a seine disconnected from said crib-netting and adapted to be adjusted or drawn across the opening or mouth of the crib-netting to close the same, and means for fastening the seine in place, as and for the purposes described.

2. The combination with suitable anchoring-stanchions, of a crib-netting having a bottom and attached to said stanchions in a manner to permit the mouth end of the crib to be raised without disturbing the stanchions, and a seine which is unattached to the crib and is arranged to close the open end or mouth of the crib, substantially as and for the purposes described.

3. The combination with suitable anchoring-stanchions, of a crib provided with a bottom and having its closed rear end attached to certain of the stanchions and its open end or mouth slidably connected to certain other stanchions, and a seine which is held to close the open end or mouth of the crib without attaching the crib or seine and without the seine interfering with the raising or lowering of the crib, substantially as and for the purposes described.

4. The combination with anchoring-stanchions, and a crib, of auxiliary stanchions arranged close to the anchoring-stanchions, and a seine confined between the anchoring and the auxiliary stanchions, substantially as described.

5. The combination with anchoring-stanchions, and a crib, of the auxiliary stanchions, the couplings between the anchoring and auxiliary stanchions, stay links or loops connecting the two sets of standards, and a seine confined between the two sets of stanchions, substantially as described.

6. The combination with anchoring-stanchions, and a crib, of the auxiliary stanchions, a seine confined between the anchoring and auxiliary stanchions, and antifriction devices carried by one of the stanchions for the seine to ride against, substantially as described.

7. The combination with anchoring-stanchions, and a crib, of the auxiliary stanchions, the couplings, the sleeves or thimbles fitted loosely on the auxiliary stanchions, and a seine to be confined between the auxiliary and anchoring stanchions and to ride against the sleeves or thimbles, substantially as described.

8. The combination with anchoring and auxiliary stanchions, a crib, and a seine, of floatable pulleys fitted loosely on the auxiliary stanchions, substantially as described.

9. A seine provided with floats along one edge thereof, the end bars, and fastening-cords, combined with a crib having an open mouth, and stanchions to which the crib is anchored and to which are adapted to be connected the fastening-cords of the seine, as and for the purposes described.

10. The combination with suitable anchoring-stanchions, of stationary guide-rods, a crib having means for slidably connecting the same to the guide-rods, and a seine adapted to be attached to said stanchions, substantially as and for the purposes described.

11. The combination with anchoring-stanchions, of the guide-rods detachably connected to the stanchions, a crib having at its free end edges the rings or loops which are slidably fitted on the guide-rods, and a seine to close the mouth of the crib, substantially as described.

12. The combination with anchoring-stanchions, of the guide-rods provided with feet which are connected to said stanchions, the links connecting the upper ends of the rods and stanchions, a crib with links which are fitted on the rods, and a seine, substantially as and for the purposes described.

I testimony whereof I affix my signature in presence of two witnesses.

JOHN CARLOS BURDICK.

Witnesses:
    JO W. TEMPLE,
    A. J. HARPOLE.